United States Patent [19]

Flynn

[11] 4,186,956

[45] Feb. 5, 1980

[54] LOG CARRIER

[76] Inventor: Dennis E. Flynn, 558 W. 11th, Winner, S. Dak. 57580

[21] Appl. No.: 929,171

[22] Filed: Jul. 28, 1978

[51] Int. Cl.² ............................................. B65G 7/12
[52] U.S. Cl. ..................................... 294/16; 294/117
[58] Field of Search ..................... 294/11, 16, 28, 33, 294/50.8, 99 R, 99 S, 106, 107, 110 A, 117–119; 224/45 E

[56] References Cited

U.S. PATENT DOCUMENTS

| 7,709 | 10/1850 | Warner et al. ............... 294/110 A |
| 504,166 | 8/1893 | Kroll ............................... 294/99 R |
| 823,466 | 6/1906 | Felton ............................. 294/99 R |
| 1,824,644 | 9/1931 | Webb .............................. 294/117 |
| 2,185,561 | 1/1940 | Nenstiel ......................... 294/16 |
| 3,288,513 | 11/1966 | Behrick ..................... 294/110 A X |
| 3,384,407 | 5/1968 | Thrash ............................ 294/16 |

FOREIGN PATENT DOCUMENTS

| 167669 | 2/1934 | Fed. Rep. of Germany ............. 294/16 |
| 234421 | 5/1925 | United Kingdom ...................... 294/11 |

Primary Examiner—Johnny D. Cherry
Attorney, Agent, or Firm—Clarence A. O'Brien; Harvey B. Jacobson

[57] ABSTRACT

First and second opposite side pairs of laterally spaced upstanding tong arms defining open sided recesses opening toward each other are provided. The tong arms include upper and lower ends and structure is provided pivotally connecting the upper base ends of the tong arms together for relative swinging of the lower ends of the tong arms toward and away from each other. A downwardly opening generally C-shaped spring handle including remote handle ends is provided and structure pivotally attaches each handle end to a corresponding pair of laterally spaced tong arms intermediate the upper and lower ends thereof for angular displacement of the handle ends relative to the arms about parallel horizontal axes disposed at generally right angles relative to the directions in which the tong arms open, the C-shaped spring handle being disposed in a plane generally paralleling the planes in which the tong arms swing relative to each other. An upstanding first class lever has its vertical midportion pivotally attached to the upper base ends of the tongue arms, its lower end portion pivotally attached to one handle end and the upper end of the lever projects above the upper portion of the C-shaped spring handle.

6 Claims, 6 Drawing Figures

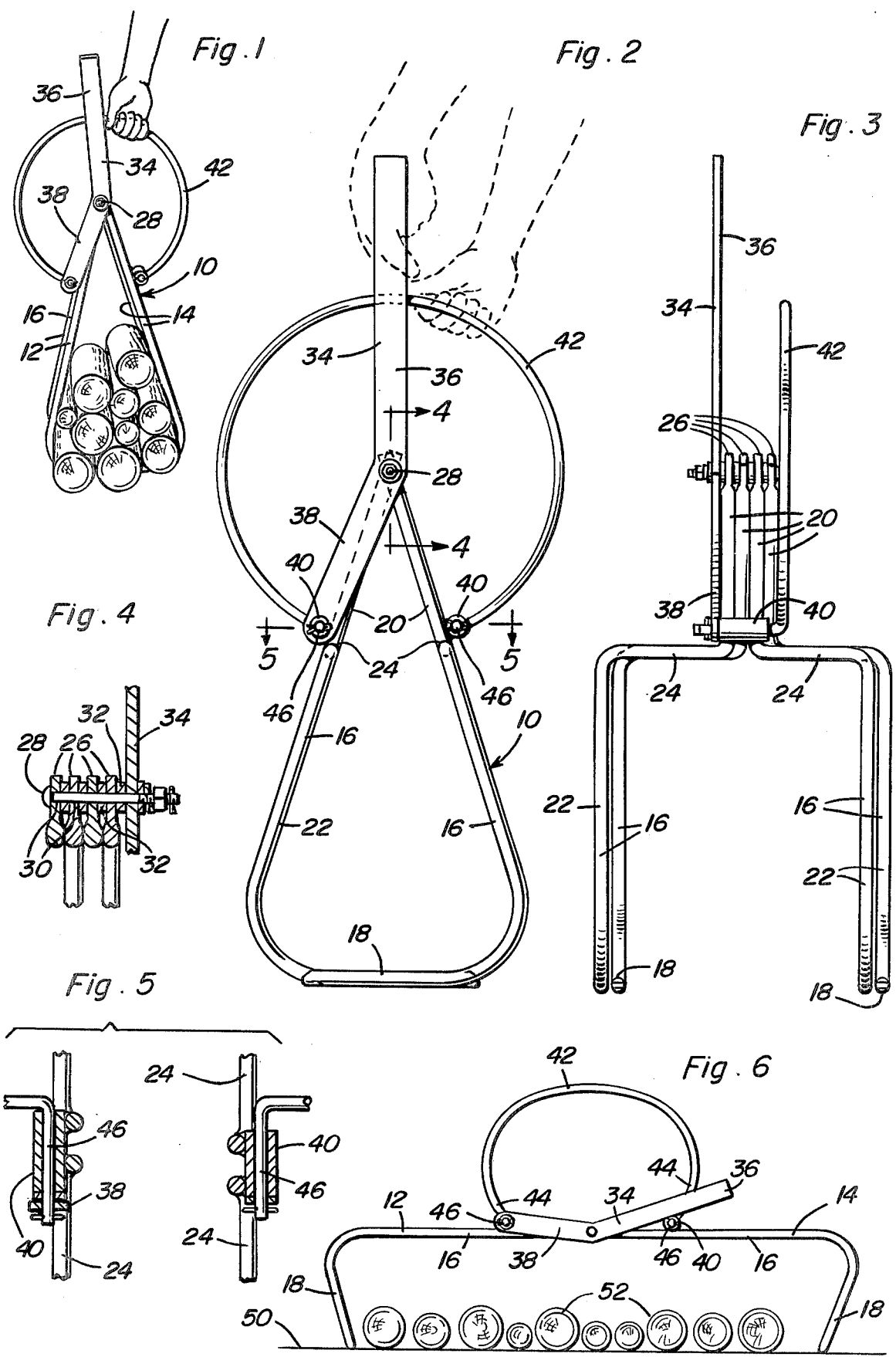

LOG CARRIER

BACKGROUND OF THE INVENTION

Various forms of log carriers have been heretofore provided such as those disclosed in U.S. Pat. Nos. 486,963, 2,096,104, 3,118,697 and 3,384,407. In addition, similar tong structures intended for other purposes have also been designed such as the tongs disclosed in U.S. Pat. No. 3,269,764.

However, the log carrying tongs of the above noted prior patents are not particularly well adapted for carrying a plurality of fireplace logs. Inasmuch as log carriers are conventionally utilized to carry logs stored outside a building into a building to a position adjacent a fireplace in the building, it is desirable that a log carrier be able to carry a plurality of logs.

Previously known log carriers also are constructed in a manner whereby when the carrier is placed upon the ground there is a tendency for the carrier to release the log or logs supported thereby. Accordingly, if it becomes necessary to momentarily rest a load of logs, there is a risk of previously known log carriers releasing the logs supported therefrom. Therefore, there is also a need for a log carrier which may be placed upon the ground with a load of logs therein and with the log carrier constructed in a manner whereby support of the log carrier and the load therein from the ground will not result in the log carrier releasing the load of logs supported therefrom.

It is also to be noted that still other forms of log carriers and tongs may not be utilized to pick up a plurality of logs resting in side-by-side upon a horizontal support surface and that there is a further need to provide a log carrier which may be utilized to pick up a plurality of logs.

BRIEF DESCRIPTION OF THE INVENTION

The carrier of the instant invention is constructed, primarily, of heavy gauge rod stock and includes a handle portion thereof acting as a spring yieldingly biasing the jaws or tong arms of the carrier toward the closed positions thereof. In addition, the handle portion is constructed in a manner enabling ready support thereof by the hands of two persons disposed on opposite sides of the carrier when a heavy load of logs is supported from the carrier and the handle structure includes features which inherently increase the biasing action on the jaws of the carrier to close the latter in response to a heavy being load supported from the carrier. Also, the carrier includes an operator operatively associated with the relatively pivotal tong arms of the carrier and the spring handle thereof in a manner such that the tong arms may be swung past center positions thereof to enable the spring handle portion to yieldingly bias the tong arms toward the full open positions thereof as opposed to closed positions thereof.

The main object of this invention is to provide a log carrier which may be conveniently utilized to carry a plurality of logs.

Another object of this invention is to provide a log carrier including a novel handle construction also functioning as spring structure for yieldingly biasing the tong arms of the carrier toward the closed positions thereof and operable, when the carrier is used to support heavy loads, to increase the biasing action of the spring handle on the tong arms to swing the latter toward the closed position.

Still another object of this invention is to provide a log carrier constructed in a manner whereby a plurality of logs supported therefrom will not tend to be disengaged from the carrier when the loaded carrier is disposed in a rest position upon a horizontal support surface therefor.

Still another important object of this invention is to provide a log carrier constructed in a manner enabling a plurality of logs to be scooped up by and into the carrier from a horizontal support surface.

Another important object of this invention is to provide a log carrier which may be readily carried by two persons.

A final object of this invention to be specifically enumerated herein is to provide a log carrier in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a perspective view of the log carrier in use supporting a plurality of fireplace logs therefrom;

FIG. 2 is an enlarged end elevational view of the log carrier in the closed position thereof;

FIG. 3 is a side elevational view of the log carrier as seen from the right side of FIG. 2;

FIG. 4 is an enlarged fragmentary vertical sectional view taken substantially upon the plane indicated by the section line 4—4 of FIG. 2;

FIG. 5 is a fragmentary, horizontal sectional view taken substantially upon the plane indicated by the section line 5—5 of FIG. 2; and FIG. 6 is an end elevational view of the log carrier positioned over a plurality of side-by-side logs supported from a horizontal support surface and with the log carrier in position to scoop the plurality of logs from the support surface therefor.

DETAILED DESCRIPTION OF THE INVENTION

Referring now more specifically to the drawings, the numeral 10 generally designates the log carrier of the instant invention. The log carrier 10 includes pairs of opposite side generally L-shaped tong arms 12 and 14. The tong arms 12 and 14 each include an upstanding portion 16 terminating downwardly in a horizontal portion 18. The upstanding portions 16 of each pair of tong arms include upper and lower portions 20 and 22 interconnected by horizontal portions 24 extending longitudinally of the carrier 10. The horizontal portions 24 of each pair of tong arms 12 and 14 laterally offset the lower portions 22 thereof away from each other. The upper ends of the upper portions 20 are flattened as at 26 and pivotally secured together by means of a pivot fastener 28 secured through apertures 30 formed in the flattened portions 26. Washers 32 are disposed between adjacent flattened portions 26 on the pivot fastener 28 and the midportion of an elongated first class lever 34 is also pivotally supported from the pivot fastener 28, the lever 34 including upper and lower end portions 36 and 38 disposed above and below, respectively, the pivot fastener 28.

Each pair of upper portions 20 has a pivot and bracing sleeve 40 secured thereto in any convenient manner, such as by welding, and the sleeves 40 rigidly interconnect and brace the lower end portions of corresponding upper portions 20 of the tong arms 12 and 14.

A generally C-shaped and downwardly opening spring handle 42 is provided and the handle 42 includes opposite handle ends 44 terminating in right angle terminal ends 46 rotatably received through the corresponding sleeves 40. The medial plane of the C-shaped handle 42 generally parallels the planes in which the upper portions 20 of the tongs 12 and 14 are swingable and the lower end portion 38 of the lever 34 is pivotally anchored to one of the terminal ends 46, see FIGS. 2 and 5. The upper end portion 36 of the lever 34 projects above the central portion of the handle 42 as may best be seen from FIGS. 1 and 2 of the drawing, and it will be noted from FIG. 2 of the drawing, that when the horizontal portions 18 of the tong arms 12 and 14 are disposed in horizontally overlapped closed positions, they are horizontally disposed, whereby their undersurface portions comprise abutment surfaces for engaging a horizontal support surface for the carrier 10.

The handle 42 is, of course, constructed of resilient material so as to comprise a spring which yieldingly biases the tong arms 12 and 14 toward the closed positions thereof illustrated in FIG. 2.

In operation, the upper end portion 36 of the lever 34 may be swung in a clockwise direction relative to the right hand side portion of the handle 42 illustrated in FIG. 2 in order to cause the tong arms 12 and 14 to swing to the fully open over center positions thereof illustrated in FIG. 6 of the drawing. When the tong arms 12 and 14 are swung to the over center positions thereof, the upper end portion 36 of the lever 34 abuts the sleeve 40 opposite to the sleeve 40 from which the base end portion 38 of the lever 34 is pivotally supported and thus limits swinging movement of the tong arms 12 and 14 past the center positions thereof.

From FIG. 6 it may be seen that when the tong arms 12 and 14 are in the fully open over center positions thereof, the portions 16 thereof are horizontally disposed with the portions 18 being slightly downwardly convergent for engagement of the free ends thereof with a horizontal support surface 50 upon which a plurality of logs 52 are disposed in side-by-side relation, the plurality of logs 52 being embracingly received between the portions 18 of the tong arms 12 and 14. Then, the end portion 36 of the lever 34 may be swung in a counterclockwise direction relative to the adjacent end of the handle 42 in order to swing the tong arms 14 pass the over center positions thereof and enable the spring handle 42 to yieldingly bias the tong arms 12 and 14 toward the closed positions thereof illustrated in FIG. 2 of the drawing. During such movement of the tong arms 12 and 14 toward their closed positions from the positions thereof illustrated in FIG. 6, the tong arms 12 and 14 will engage and scoop up the logs 52 on the surface 50 whereby the plurality of logs 52 may be carried in the manner illustrated in FIG. 1 of the drawing.

From FIGS. 1 and 2 of the drawing it may be seen that when it is desired to rest after carrying a load of logs 52 a considerable distance, the carrier 10 may be readily engaged with the ground in a manner such that the undersurface portions of the horizontal portions 18 frictionally engage the ground. This frictional engagement of the horizontal portions 18 with a horizontal supporting surface upon which the carrier 10 is rested while supporting a plurality of logs prevents the tong arms 12 and 14 from swinging toward their open positions. Still further, in the event a heavy load of logs is supported from the carrier 10, two people may engage the handle 42 on opposite sides of the upper end portion 36 and the lever 34 in order to carry the heavy load. The support of the carrier 10 in this manner causes the handle 42 to be flexed intermediate the terminal ends 46 thereof and portions thereof engaged by the hands of the people supporting the carrier and thereby causes additional forces to be applied against the tong arms 12 and 14 resisting movement of the tong arms 12 and 14 toward their open positions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A carrier for carrying a plurality of fireplace length logs, said carrier including first and second opposite side pairs of laterally spaced upstanding tong arms defining open sided recesses opening toward each other and including upper and lower base and free ends, respectively, means pivotally connecting the upper base ends of said pairs of tong arms together for relative swinging of the lower free ends of the pairs of tong arms toward and away from each other, a downwardly opening generally C-shaped spring handle including remote handle ends, means pivotally attaching each handle end to a corresponding pair of laterally spaced tong arms intermediate the upper and lower ends thereof for angular displacement of said handle ends relative to said arms about parallel horizontal axes disposed at generally right angles relative to the directions in which said tong arms open, said tong arms being generally L-shaped with the upstanding portions thereof upwardly convergent toward the axis of relative swinging of said tong arms, the lower horizontal portions of the first and second pairs of L-shaped tong arms being laterally spaced, generally straight, horizontally registered and horizontally lengthwise overlapped.

2. A carrier for carrying a plurality of fireplace length logs, said carrier including first and second opposite side pairs of laterally spaced upstanding tong arms defining open sided recesses opening toward each other and including upper and lower base and free ends, respectively, means pivotally connecting the upper base ends of said pairs of tong arms together for relative swinging of the lower free ends of the pairs of tong arms toward and away from each other, a downwardly opening generally C-shaped spring handle including remote handle ends, means pivotally attaching each handle end to a corresponding pair of laterally spaced tong arms intermediate the upper and lower ends thereof for angular displacement of said handle ends relative to said arms about parallel horizontal axes disposed at generally right angles relative to the directions in which said tong arms open, an upstanding elongated first class lever having its lower end pivotally anchored to one pair of said tong arms intermediate the upper and lower ends thereof and its midportion pivotally anchored relative to the upper base ends of said pairs of tongs, the upper end portion of said lever projecting upwardly above said handle.

3. The combination of claim 2 wherein said tong arms are generally L-shaped with the upstanding portions thereof upwardly convergent toward the axis of relative swinging of said tong arms.

4. The combination of claim 2 wherein said tong arms are swingable toward an open limit position with the lower free ends thereof displaced away from each other and said parallel axes disposed in a horizontal plane spaced above the pivot axis of relative oscillation of said pairs of tong arms.

5. A carrier for carrying a plurality of fireplace length logs, said carrier including first and second opposite side pairs of laterally spaced upstanding tong arms defining open sided recesses opening toward each other and including upper and lower base and free ends, respectively, means pivotally connecting the upper base ends of said pairs of tong arms together for relative swinging of the lower free ends of the pairs of tong arms toward and away from each other, a downwardly opening generally C-shaped spring handle including remote handle ends, means pivotally attaching each handle end to a corresponding pair of laterally spaced tong arms intermediate the upper and lower ends thereof for angular displacement of said handle ends relative to said arms about parallel horizontal axes disposed at generally right angles relative to the directions in which said tong arms open, said tong arms being swingable toward an open limit position with the lower free ends thereof displaced away from each other and said parallel axes disposed in a horizontal plane spaced about the pivot axis of relative oscillation of said pairs of tong arms, an upstanding elongated first class lever having its lower end pivotally anchored to one pair of said tong arms intermediate the upper and lower ends thereof and its midportion pivotally anchored relative to the upper base ends of said pairs of tongs, the upper end portion of said lever projecting upwardly above said handle.

6. The combination of claim 5 wherein the upper end portion of said lever is abuttingly engageable with one of said tong arms to limit relative swinging of said tong arms toward their open limit positions.

* * * * *